United States Patent
Bogojeska et al.

(10) Patent No.: US 9,406,023 B2
(45) Date of Patent: Aug. 2, 2016

(54) SYSTEM RECOMMENDATIONS BASED ON INCIDENT ANALYSIS

(71) Applicant: International Business Machines Corporation, Armonk, NY (US)

(72) Inventors: Jasmina Bogojeska, Adliswil (CH); Ioana Giurgiu, Zurich (CH); David Lanyi, Adliswil (CH); Mario Lucic, Adliswil (CH); Birgit Pfitzmann, Wettswil (CH); George E. Stark, Lakeway, TX (US); Dorothea Wiesmann, Oberrieden (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 14/135,077

(22) Filed: Dec. 19, 2013

(65) Prior Publication Data

US 2015/0178637 A1    Jun. 25, 2015

(51) Int. Cl.
| | |
|---|---|
| *G06F 15/18* | (2006.01) |
| *G06N 5/04* | (2006.01) |
| G06N 5/02 | (2006.01) |
| G06N 99/00 | (2010.01) |
| G06N 7/00 | (2006.01) |
| G06K 9/62 | (2006.01) |

(52) U.S. Cl.
CPC ............... *G06N 5/04* (2013.01); *G06K 9/6256* (2013.01); *G06K 9/6269* (2013.01); *G06N 5/025* (2013.01); *G06N 7/005* (2013.01); *G06N 99/005* (2013.01)

(58) Field of Classification Search
None
See application file for complete search history.

(56) References Cited

U.S. PATENT DOCUMENTS 7,051,320 B2 *   5/2006   Claiborne ........... H04L 41/0813
                                                           717/127
8,417,996 B2     4/2013   Anand et al.
(Continued)

FOREIGN PATENT DOCUMENTS

JP            2011204179 A        10/2011

OTHER PUBLICATIONS

Classifying Server Behavior and Predicting Impact of Modernization Actions 2013 Jasmina Bogojeska , David Lanyi , Ioana Giurgiu , George Starky and Dorothea Wiesmann IBM Research—Zurich, Säumerstrasse 4, CH-8803 Rüschlikon Switzerland, fjbo, dla, igi, dorg@zurich.ibm.com yIBM Global Technology Services 294 Route 100 Somers, NY 10589, USA.*

(Continued)

*Primary Examiner* — Kakali Chaki
*Assistant Examiner* — Ababacar Seck
(74) *Attorney, Agent, or Firm* — Cantor Colburn LLP; Daniel Morris

(57) ABSTRACT

In one embodiment, a computer-implemented method includes obtaining incident data related to a plurality of servers, including a first server. Configuration data is obtained for each of the plurality of servers. The configuration data includes information about a set of one or more configuration items of the first server. A predictive modeler is trained to predict incident characteristics, based at least in part on the incident data and the configuration data. A modification is selected to the set of configuration items of the first server. Predicted incident characteristics of the first server are simulated, by a computer processor, based on the selected modifications. It is recommended that the selected modifications be made to the first server if predetermined criteria are met by the simulation.

20 Claims, 4 Drawing Sheets

(56) References Cited

U.S. PATENT DOCUMENTS

| | | | |
|---|---|---|---|
| 8,510,718 B2* | 8/2013 | Hemade | H04L 41/0869 717/126 |
| 2013/0002697 A1 | 1/2013 | Ashley et al. | |
| 2013/0132460 A1 | 5/2013 | Atkins et al. | |
| 2013/0290512 A1* | 10/2013 | Ngoo | H04L 41/147 709/224 |

OTHER PUBLICATIONS

Y. Diao, H. Jamjoom, and D. Loewenster, "Rule-based problem classification in it service management" 2009, Proc. IEEE Cloud, pp. 221-228.

R. Gupta, H. Prasad, L. Luan, D. Rosu, and C. Ward, "Multi-dimensional knowledge integration for efficient incident management in a services cloud," 2009, Proc. IEEE SCC, pp. 57-64.

G. A. D. Lucca, M. D. Penta, and S. Gradara, "An approach to classify software maintenance requests," 2002, Proc. IEEE ICSM., pp. 1-10.

Y. Diao, A. Heching, D. Northcutt, and G. Stark, "Modeling a complex global service delivery system," 2011, Proc. Winter Simulation Conference, pp. 690-702.

L. Tang, T. Li, F. Pinel, L. Shwartz, and G. Grabarnik, "Optimizing system monitoring configurations for non-actionable alerts," Proc. of IFIP NOMS, pp. 34-42, 2012.

J. L. Hellerstein, S. Ma, and C.-S. Perng, "Discovering actionable patterns in event data," 2002, IBM Systems Journal, vol. 43(3), pp. 475-493.

W. Peng, C. Perng, and H. Wang, "Event summarization for system management," 2007, Proc. of ACM KDD, vol. 43 (3), pp. 1028-1032.

J. S. Bozman and K. Broderick, "Server refresh: Meeting the changing needs of enterprise it with hardware/software optimization," 2010, IDC Whitepaper, pp. 1-13.

* cited by examiner

SYSTEM RECOMMENDATIONS BASED ON INCIDENT ANALYSIS

BACKGROUND

Various embodiments of this disclosure relate to configuration, performance, and incident analysis and, more particularly, to making system modifications based on these analyses.

Decisions about modifying server configurations are generally made manually, based on simple business rules. For example, when a system is not behaving as desired, it is standard to perform an operating system upgrade or to swap out current hardware with newer hardware.

Regardless of how system change determinations are made, if a system is experiencing issues, an incident ticket may be issued, either manually or automatically. The Information Technology Infrastructure Library (ITIL) defines an "incident" as an unplanned interruption to an information technology (IT) service or a reduction in the Quality of an IT service, while a problem is a cause of one or more incidents. A ticket is a request that a system receive attention for the purpose of resolving some existing incident. Generally, a human being will need to assess each ticket, and as a result, ticket management may slow down the operation of a server or set of servers, some of which may not be able to continue processing work as intended without their tickets having been addressed.

SUMMARY

In one embodiment of this disclosure, a computer-implemented method includes obtaining incident data related to a plurality of servers, including a first server. Configuration data is obtained for each of the plurality of servers. The configuration data includes information about a set of one or more configuration items of the first server. A predictive modeler is trained to predict incident characteristics, based at least in part on the incident data and the configuration data. A modification is selected to the set of configuration items of the first server. Predicted incident characteristics of the first server are simulated, by a computer processor, based on the selected modifications. It is recommended that the selected modifications be made to the first server if predetermined criteria are met by the simulation.

In another embodiment, a system includes a standardizer, a predictive modeler, a feature selector, and a recommendation reporter. The standardizer is configured to obtain incident data related to a plurality of servers, including a first server, and to obtain configuration data for each of the plurality of servers. The configuration data includes information about a set of one or more configuration items of the first server. The predictive modeler is configured to predict incident characteristics, based at least in part on training from the incident data and the configuration data. The feature selector is configured to select a modification to the set of configuration items of the first server, where the predictive modeler is further configured to predict incident characteristics of the first server based on the selected modifications. The recommendation reporter is configured to recommend that the selected modifications be made to the first server if predetermined criteria are met by the simulation.

In yet another embodiment, a computer program product includes a computer readable storage medium having computer readable program code embodied thereon. The computer readable program code is executable by a processor to perform a method. The method includes obtaining incident data related to a plurality of servers, including a first server. Further according to the method, configuration data is obtained for each of the plurality of servers. The configuration data includes information about a set of one or more configuration items of the first server. A predictive modeler is trained to predict incident characteristics, based at least in part on the incident data and the configuration data. A modification is selected to the set of configuration items of the first server. Predicted incident characteristics of the first server are simulated, based on the selected modifications. It is recommended that the selected modifications be made to the first server if predetermined criteria are met by the simulation.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of this disclosure include recommendation systems configured to recommend server modifications based on historical server configuration, performance, and incident data. As an improvement over existing incident analysis systems, and as an improvement over existing method for determining server modifications, the recommendation system may use incident data, such as in the form of tickets, to make system modification recommendations that can reduce future ticket issuance.

Figure 1:
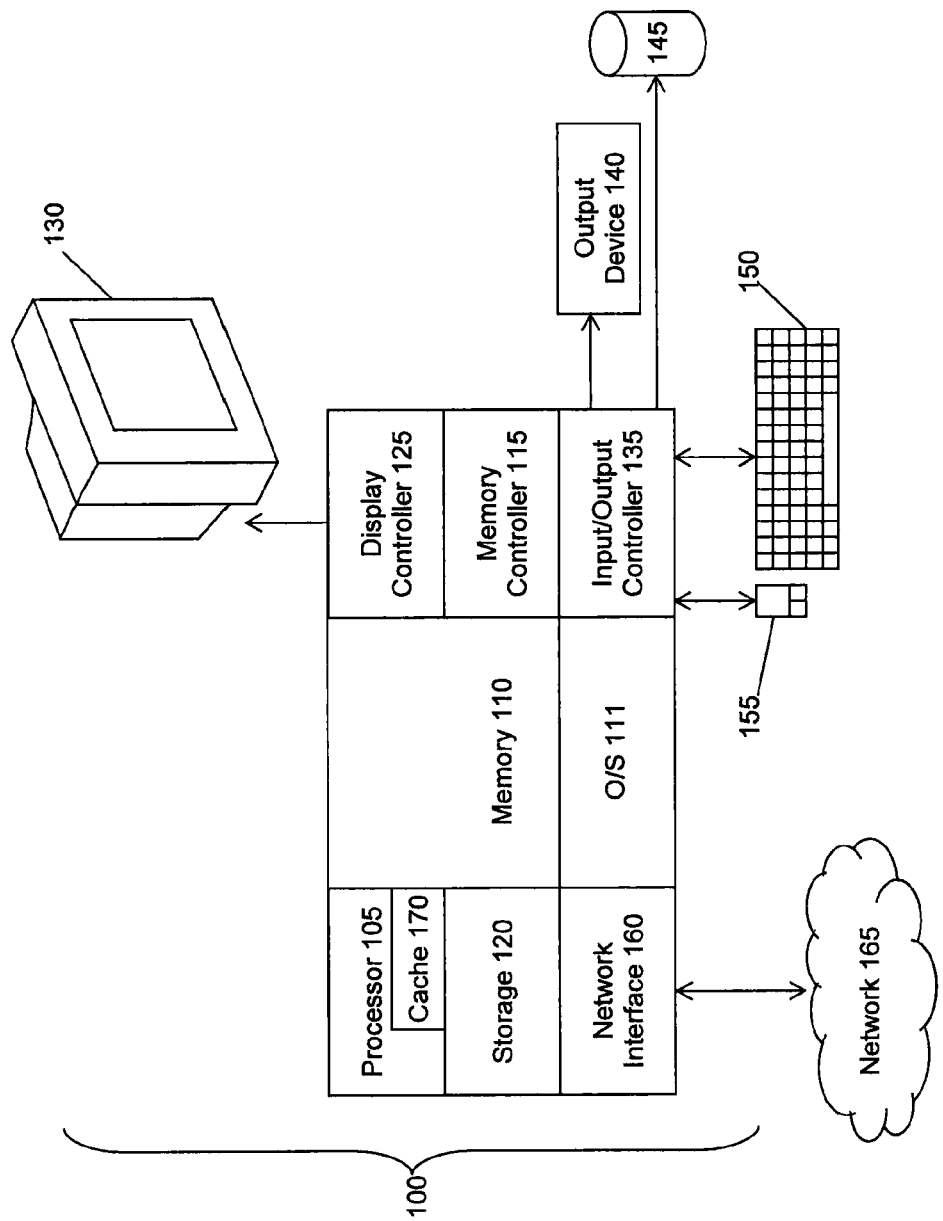
FIG. 1 is a block diagram of an exemplary computing device for implementing aspects of a recommendation system, according to some embodiments of this disclosure.

FIG. 1 illustrates a block diagram of a computer system 100 for use in implementing a recommendation system or method according to some embodiments. The recommendation systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer system 100 includes a processor 105, memory 110 coupled to a memory controller 115, and one or more input devices 145 and/or output devices 140, such as peripherals, that are communicatively coupled via a local I/O controller 135. These devices 140 and 145 may include, for example, a printer, a scanner, a microphone, and the like. A conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be any custom made or commercially available processor, a central processing unit (CPU), an auxiliary processor among several processors associated with the computer system 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the recommendation systems and methods of this disclosure.

The computer system 100 may further include a display controller 125 coupled to a display 130. In an exemplary embodiment, the computer system 100 may further include a network interface 160 for coupling to a network 165. The network 165 may be an IP-based network for communication between the computer system 100 and any external server, client and the like via a broadband connection. The network 165 transmits and receives data between the computer system 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Recommendation systems and methods according to this disclosure may be embodied, in whole or in part, in computer program products or in computer systems 100, such as that illustrated in FIG. 1.

Figure 2:
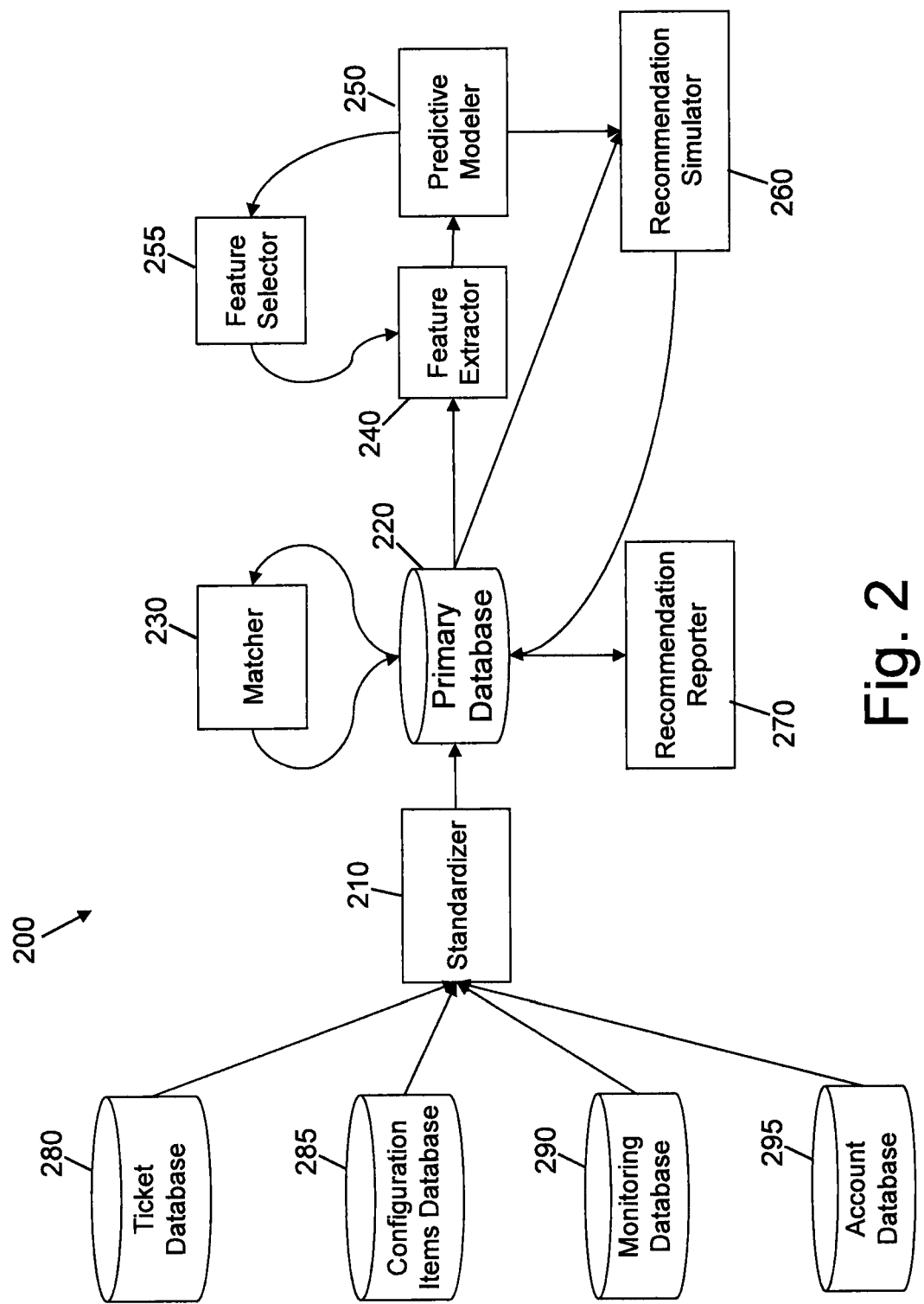
FIG. 2 is a block diagram of a recommendation system, according to some embodiments of this disclosure.

FIG. 2 is a block diagram of a recommendation system 200, according to some embodiments of this disclosure. The recommendation system 200 may receive information from data sources containing information related to multiple servers. Based in part on configuration data, performance data, incident data, or a combination thereof within this information, the recommendation system 200 may make recommendations about changes to the various servers.

As shown in FIG. 2, some embodiments of the recommendation system 200 may include one or more of a standardizer 210, a primary database 220, a matcher 230, a feature extractor 240, a predictive modeler 250, a feature selector 255, a recommendation simulator 260, and a recommendation reporter 270, which may each include hardware, software, or a combination of hardware and software. Although the standardizer 210, primary database 220, matcher 230, feature extractor 240, predictive modeler 250, feature selector 255, recommendation simulator 260, and recommendation reporter 270 are depicted and described herein as being distinct components, this need not be the case. Such distinction is made for illustrative purposes only. Rather, these aspects of the recommendation system 200 may share hardware, software, or both, and may be further divided as needed dependent on specific implementations.

One or more of these aspects of the recommendation system 200 may be embodied, in whole or in part, in a computer system 100 such as that shown in FIG. 1. Additionally, the one or more servers may each be a computer system 100 such as that shown in FIG. 1.

The standardizer 210 may receive data from various sources, which data may be related to tickets or other incident data, and may standardize that data to a format that can be maintained by the primary database 220 and read and analyzed by other aspects of the recommendation system 200. In some embodiments, the data sources from which the standardizer 210 received data may include, for example, a ticket database 280, a configuration items database 285, a monitoring database 290, and one or more account databases 295. It will be understood that the term "database," as used herein, need not be limited to a relational database, but may instead refer to various organizational structures for maintaining data.

The ticket database 280 may include incident details, such as details of the problems for which tickets were issued. As used herein with respect to various embodiments of this disclosure, the term "incident" may refer to an incident under the ITIL's definition, or may more broadly refer to a problem experienced by a computer system. For each issued ticket, these incident details may include, for example, an identifier (e.g., IP address, MAC address, alias) of the server for which the ticket was issued, a category of the problem leading to the ticket, the specific problem at issue, narrative details entered by a user regarding the problem, failure class, severity, assigned team, ticket generation mechanism, ticket generation time, resolution time, and resolution result. The configuration items database 285 may include data about the various servers for which recommendations may be made by the recommendation system 200. This data may include server details, such as hardware specifications, current operating systems, user applications, enterprise applications, virtual machine usage and configuration, age, size, performance, utilization, environment, functions, service management system, location, and prior feature modifications. The monitoring database 290 may include information about actual operation of the servers, which data may be obtained through monitoring the servers. While monitoring, performance data may be collected for each of the plurality of servers and stored in the monitoring database 290. Thus, the performance data in the monitoring database may include information about resource utilization of each server, such as, for example, processor, storage, and memory utilization, as well as information about the types of jobs processed by the various servers. The account database 295 may include notes about various client accounts related to the servers. In general, the recommendation system 200 may service one or more client accounts, where each account is associated with one or more server owned or used by the associated client. The information in the account database 295 may include, for example, information about the client accounts, specific client preferences, and notes taken by IT representatives related to the accounts and their various associated servers.

The standardizer 210 may have access to the ticket database 280, the configuration items database 285, the monitoring database 290, the account database 295, or other data sources. The standardizer 210 may receive the various data from these data sources and translate it into a standard format so that it may be more efficiently processed by other aspects of the recommendation system 200. After the data from these data sources is standardized, it may be placed as records into the primary database 220. The primary database 220 may maintain data related to, for example, the various tickets issued, server configurations, server monitoring, account details, and other data gleaned from the data sources accessed by the standardizer 210.

The matcher 230 may be in communication with the primary database 220, and may match related records found in the data sources and drawn into the primary database 220. For instance, the matcher 230 may determine that a first ticket identified in the ticket database 280 is related to a specific server for which configuration details were drawn from the configuration items database 285, and whose monitoring details were drawn from the monitoring database 290. Accordingly, the matcher 230 may draw relationships across records from data received from the various data sources.

The feature extractor 240 may extract model-relevant features from the primary database 220. Determination of which features are model-relevant may be based on the implementation of the predictive modeler 250 being used. For instance, in some embodiments, the predictive modeler 250 may be based solely on hardware and operating systems, and in that case, the hardware and operating system specifications may be the model-relevant features that are extracted by the feature extractor 240. In general, features of a server may be deemed to be model-relevant if they are considered by the predictive modeler 250 during training and simulations. The model-relevant features may have originated from various ones of the data sources, such as from the configuration items database 285, where each configuration item may be used as a model-relevant feature.

After the model-relevant features are extracted, the predictive modeler 250 may use these extracted features for training The specific type of training used may be dependent on the implementation of the predictive modeler 250. In some embodiments, for example the predictive modeler 250 may use a random forest classifier, logistic regression model, neural network, classification tree, support vector machine, or other mechanism for making determinations intelligently based on historical data training One of skill in the art will understand how to implement such a predictive modeler 250.

The predictive modeler 250 may be trained to predict the quantity or severity, or both, of incidents of each model-relevant feature. The training may be based on historic data related to, for example, configuration items (e.g., a hardware and software items of the servers), performance data, and incidents, which may be indicated by tickets. After training, the predictive modeler 250 may predict whether a configuration item or other model-relevant feature is problematic or unproblematic according to predefined ticket thresholds for various ticket severities. In some embodiments, the ticket thresholds may vary across the different ticket severities, such that a lower threshold is used for more severe tickets.

The predictive modeler 250 may draw correlations between incident data from the ticket database 280 and the model-relevant features of the various servers. In some embodiments, the predictive modeler 250 may be periodically or continuously trained as new data is received based on new tickets or server changes.

For example, and not by way of limitation, the predictive modeler 250 may recognize that certain combinations of hardware and software, or certain utilizations, often result in certain tickets being repeatedly issued across multiple servers. It will be understood that the types and scopes of correlations that the predictive modeler 250 is capable of making may be based, at least in part, on the model-relevant features used as well as on the specific implementation of the predictive modeler 250.

After being trained, the predictive modeler 250 may be used to determine which server modifications, i.e., modifications to model-relevant features, may benefit the various servers. To this end, the feature selector 255 may select feature changes for the servers. The feature selector 255 may select potential features for one or more of the servers. Potential features for a server may be features that do not currently exist in that server but may potentially be incorporated into the server. For example, and not by way of limitation, potential features may include hardware extensions, hardware refreshes, operating system upgrades, or operating system refreshes. In some embodiments, the features being selected may be model-relevant features, which may be relevant to correlations drawn by the predictive modeler 250 during training These potential features may include, for example, hardware changes, software changes, or utilization changes. In some embodiments, feature selection may occur automatically based on standard protocols. For example, operating system upgrades and hardware upgrades may be selected as potential features for consideration. For another example, and not by way of limitation, a brute force method may be used where various hardware and software changes are selected individually, or in combination, for consideration. In some other embodiments, however, manual intervention may be used to selected potential features for the servers.

After a set of one or more potential features are selected for changing a server, the predictive modeler 250 may predict how such feature modifications are likely to affect future tickets related to that server, or how the feature modifications may affect other aspects of server operation.

After a set of one or more potential features are selected for a server, those features may be entered into the predictive modeler 250, which may output a simulation of the resulting server. The simulation may indicate, for example, information about predicted ticketing related to the server after the selected potential features have been incorporated. This information about predicted ticketing may include, for example, frequency of tickets, severity of tickets, or indications of ongoing issues the server would be likely to experience. In some embodiments, multiple potential features or sets of potential features may be modeled and simulated for each server, or for each predefined group of servers that are likely to be modified together by their owner. Some or all results of the simulations may be written back to the primary database 220 in some embodiments. Potential features leading to sufficient improvement, based on the simulations, may be converted into actual recommendations.

The recommendation reporter 270 may output feature modification recommendations based on results of the various simulations, where each recommendation includes a set of one or more potential features to be incorporated into a server. In some embodiments, a recommendation may be directed toward a single server or a set of related servers. It may be the case that a client having a large quantity of servers may not want to be bothered with different recommendations for each individual server. Thus, in some embodiments, the recommendation reporter 270 may provide group recommendations. In a group recommendation, the recommendation reporter 270 may recommend one or more feature modifications for a set of servers deemed to be similar. For instance, the recommendation reporter 270 may suggest that all of a client's Windows 98 machines be upgraded to Windows 7. Such a recommendation may be made, for instance, if the recommendation simulator 260 found that such an operating system upgrade would be worthwhile to some or all Windows 98 servers.

Figure 3:
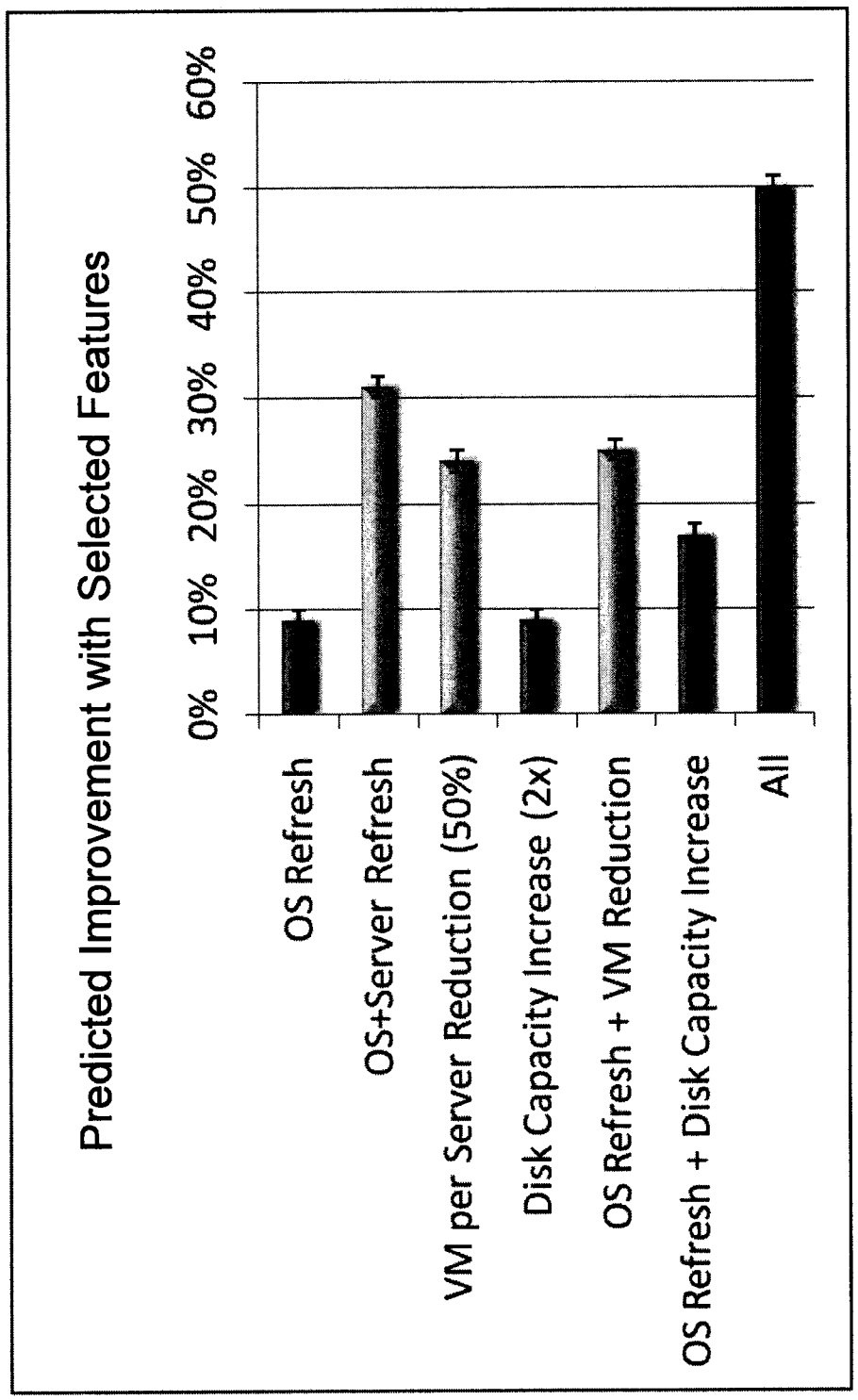
FIG. 3 is a graph illustrating exemplary improvements predicted from applying a set of one or more feature modifications to a server.

FIG. 3 is a graph illustrating exemplary improvements predicted from applying a set of one or more feature modifications to a server, according to some embodiments. The recommendation simulator 260 may output data of the type illustrated in this graph, where predicted improvements from various feature modifications are indicated. As shown, in this example, the predicted improvements may be applicable to the following modifications, where there is an associated predicted percentage improvement for each modification: operating system refresh, operating system and server refresh in combination, virtual machine per server reduction, disk capacity increase, operating system refresh and virtual machine reduction in combination, operating system refresh and disk capacity increase in combination, and overall improvement.

The percentage or degree of predicted improvement may be measured in various ways. For instance, in some embodiments, each server may be considered problematic or non-problematic, based on the quantity and severity of tickets being issued for that server. Predicted improvement may, in some embodiments, be expressed as a probability of how likely it is that a server may move from a problematic categorization to a non-problematic categorization. Thus, a nine percent improvement from an operating system refresh, as shown in FIG. 3, may indicate a nine percent chance that an operating system refresh as a feature modification may move the server into the non-problematic state from the problematic state. In some embodiments, a predetermined percentage or degree of improvement may be required before a feature modification, or set of feature modifications, is converted into a recommendation and output by the recommendation reporter 270.

Figure 4:
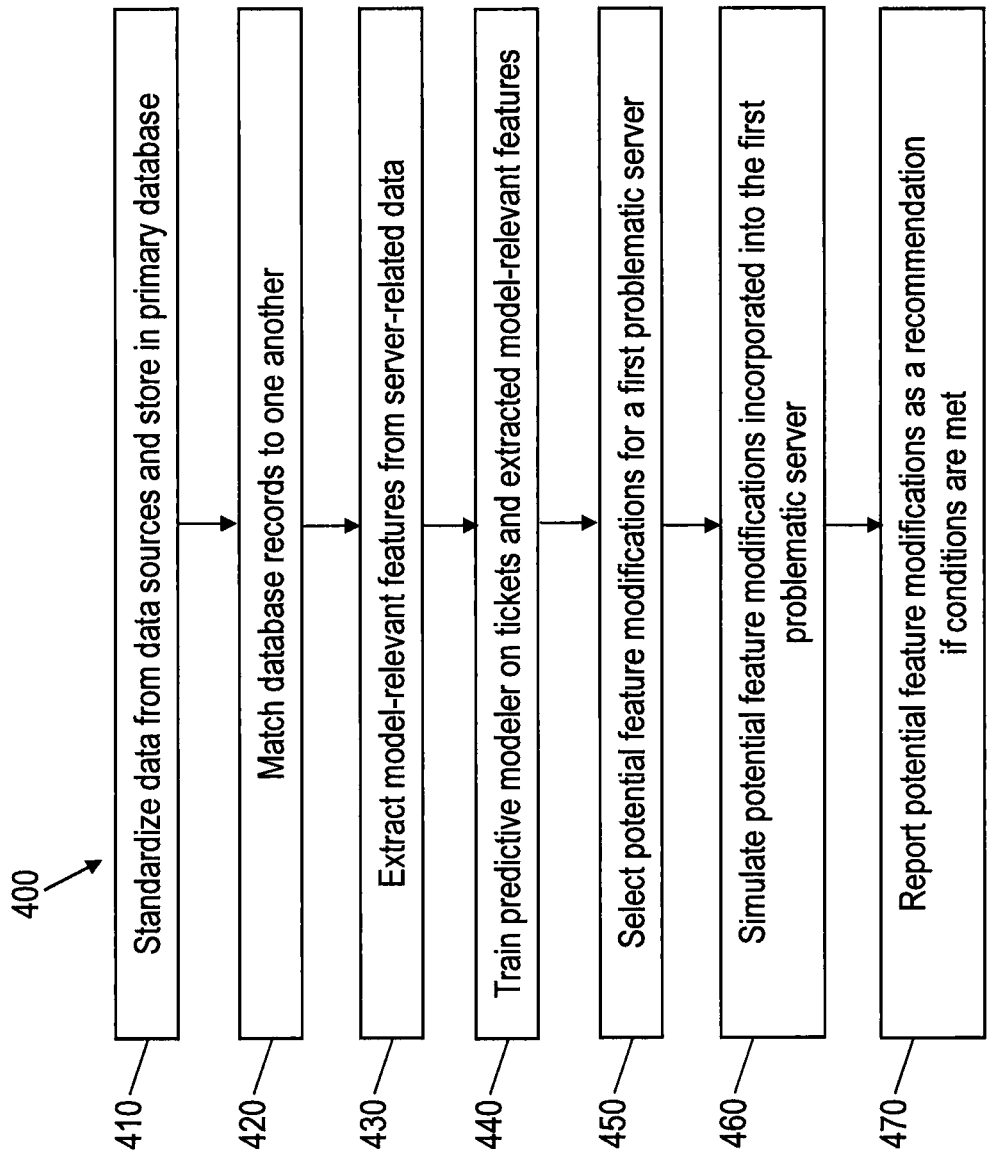
FIG. 4 is a flow diagram of a method for making server modification recommendations, according to some embodiments of this disclosure.

FIG. 4 is a flow diagram of a recommendation method 300, according to some embodiments of this disclosure. As shown, at 410, various source data may be standardized and stored in a primary database 220. At block 420, records of the source data may be matched to one another. At block 430, one or more features may be extracted from data related to various servers. At block 440, a predictive modeler 250 may be trained based on the extracted features. At block 450, a set of one or more potential feature modifications may be selected for a first server. At block 460, the potential feature modifications may be simulated. At block 470, if the feature modifications are predicted to provide sufficient improvement to the server, then such modifications may be reported to an applicable client as server modification recommendations.

Accordingly, due to various embodiments of the recommendation system 200 and method 300, server modification recommendations may be made. If such recommendations are applied by the various clients owning the servers, the quantity or severity of issued tickets may be reduced. As a result, human intervention may be required less frequently to handle ticket issues, and servers may run more efficiently.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    obtaining incident data for a server;
    obtaining configuration data for the server, wherein the configuration data includes information about data associated with a set of one or more configuration items of the first-server;
    training a predictive modeler, based at least in part on the incident data and the configuration data, to predict incident characteristics of the server;
    selecting a modification to at least one configuration item in the set of configuration items;
    generating by a computer processor and using the trained predictive modeler, simulation data indicating one or more predicted incident characteristics of the server that are associated with the modification to the at least one configuration item;
    determining, based at least in part on the simulation data, a probability that the modification to the at least one configuration item results in a change in a categorization of the server from a problematic categorization to a non-problematic categorization, wherein the categorization of the server is based at least in part on at least one of a quantity or a severity of incidents associated with the server;

determining that the probability meets or exceeds a predetermined probability; and outputting recommendation data indicating that the modification to the at least one configuration item is to be made to the server.

2. The method of claim 1, further comprising:

obtaining performance data for the server, wherein training the predictive modeler to predict the incident characteristics is further based at least in part on the performance data.

3. The method of claim 1, wherein the recommendation data is first recommendation data, the server is a first server, and the configuration data is first configuration data, the method further comprising:

obtaining second configuration data for a second server, wherein the second configuration data includes data associated with the at least one configuration item; and outputting second recommendation data indicating that the modification to the at least one configuration item is to be made to the second server.

4. The method of claim 1, wherein training the predictive modeler comprises utilizing at least one of a random forests model, a logistic regression model, a classification tree, a support vector machine, or a neural network.

5. The method of claim 1, wherein the data associated with the set of one or more configuration items comprises data associated with at least one of hardware specifications, user applications, enterprise applications, age, size, performance, utilization, environment, function, service management system, location, or prior modifications to the server.

6. The method of claim 1, wherein the incident data comprises at least one of an identifier of the server, data indicative of a category of an incident experienced by the server, a narrative description of the incident, data indicative of a failure class of the incident, data indicative of a severity of the incident, a time associated with occurrence of the incident, a time associated with resolution of the incident, or data indicative of a resolution result for the incident.

7. The method of claim 1, wherein the one or more configuration items comprise a first configuration item and a second configuration item, and wherein training the predictive modeler to predict incident characteristics of the server comprises training the predictive modeler to determine that a combination of the first configuration item and the second configuration item resulted in at least one incident of the incidents associated with the server and resulted in a respective at least one incident for each of one or more additional servers.

8. A system comprising:

a standardizer configured to obtain incident data for a server, wherein the configuration data includes information about data associated with a set of one or more configuration items of the server;

a feature selector configured to select a modification to at least one configuration item in the set of configuration items of the server;

a predictive modeler configured to be trained based at least in part on the incident data and the configuration data to predict incident characteristics, wherein the trained predictive modeler is further configured to:

generate simulation data indicating one or more predicted incident characteristics of the server that are associated with the modification to the at least one configuration item, determine, based at least in part on the simulation data, a probability that the modification to the at least one configuration item results in a change in a categorization of the server from a problematic categorization to a non-problematic categorization, wherein the categorization of the server is based at least in part on at least one of a quantity or a severity of incidents associated with the server, and determine that the probability meets or exceeds a predetermined probability; and a recommendation reporter configured to output recommendation data indicating that the modification is to be made to the server.

9. The system of claim 8, wherein the predictive modeler is configured to predict the incident characteristics further based at least in part on performance data for the server.

10. The system of claim 8, wherein the recommendation data is first recommendation data, the server is a first server, and the configuration data is first configuration data, wherein the standardizer is further configured to obtain second configuration data for a second server, the second configuration data including data associated with the at least one configuration item, and wherein the recommendation reporter is further configured to output second recommendation data indicating that the modification to the at least one configuration item is to be made to the second server.

11. The system of claim 8, wherein the predictive modeler is configured to be trained using at least one of a random forests model, a logistic regression model, a classification tree, a support vector machine, or a neural network.

12. The system of claim 8, wherein the data associated with the set of one or more configuration items comprises data associated with at least one of hardware specifications, user applications, enterprise applications, age, size, performance, utilization, environment, function, service management system, location, or prior modifications to the server.

13. The system of claim 8, wherein the incident data comprises at least one of an identifier of the server, data indicative of a category of an incident experienced by the server, a narrative description of the incident, data indicative of a failure class of the incident, data indicative of a severity of the incident, a time associated with occurrence of the incident, a time associated with resolution of the incident, or data indicative of a resolution result for the incident.

14. The system of claim 8, wherein the one or more configuration items comprise a first configuration item and a second configuration item, and wherein the predictive modeler is trained to determine that a combination of the first configuration item and the second configuration item resulted in at least one incident of the incidents associated with the server and resulted in a respective at least one incident for each of one or more additional servers.

15. A computer program product comprising a non-transitory computer readable storage medium having computer readable program code embodied thereon, the computer readable program code executable by a processor to perform a method comprising:

obtaining incident data for a server;

obtaining configuration data for the server, wherein the configuration data includes data associated with a set of one or more configuration items of the first-server;

training a predictive modeler, based at least in part on the incident data and the configuration data, to predict incident characteristics of the server;

selecting a modification to at least one configuration item in the set of configuration items;

generating, using the trained predictive modeler, simulation data indicating one or more predicted incident characteristics of the server that are associated with the modification to the at least one configuration item;

determining, based at least in part on the simulation data, a probability that the modification to the at least one configuration item results in a change in a categorization of the server from a problematic categorization to a non-problematic categorization, wherein the categorization of the server is based at least in part on at least one of a quantity or severity of incidents associated with the server;

determining that the probability meets or exceeds a predetermined probability; and outputting recommendation data indicating that the modification to the at least one configuration item is to be made to the server.

16. The computer program product of claim 15, the method further comprising:

obtaining performance data related for the server, wherein training the predictive modeler to predict the incident characteristics is further based at least in part on the performance data.

17. The computer program product of claim 15, wherein the recommendation data is first recommendation data, the server is a first server, and the configuration data is first configuration data, the method further comprising:

obtaining second configuration data for the second server, wherein the second configuration data includes data associated with the at least one configuration item; and outputting second recommendation data indicating that the modification to the at least one configuration item is to be made to the second server.

18. The computer program product of claim 15, wherein training the predictive modeler comprises utilizing at least one of a random forests model, a logistic regression model, a classification tree, a support vector machine, or a neural network.

19. The computer program product of claim 15, wherein the incident data comprises at least one of an identifier of the server, data indicative of a category of an incident experienced by the server, a narrative description of the incident, data indicative of a failure class of the incident, data indicative of a severity of the incident, a time associated with occurrence of the incident, a time associated with resolution of the incident, or data indicative of a resolution result for the incident.

20. The computer program product of claim 15, wherein the one or more configuration items comprise a first configuration item and a second configuration item, and wherein training the predictive modeler to predict incident characteristics of the server comprises training the predictive modeler to determine that a combination of the first configuration item and the second configuration item resulted in at least one incident of the incidents associated with the server and resulted in a respective at least one incident for each of one or more additional servers.

* * * * *